US012586404B2

(12) United States Patent
Vanapalli Venkata et al.

(10) Patent No.: US 12,586,404 B2
(45) Date of Patent: Mar. 24, 2026

(54) METHOD AND SYSTEM FOR RELEVANT DATA EXTRACTION FROM A DOCUMENT

(71) Applicant: L&T TECHNOLOGY SERVICES LIMITED, Chennai (IN)

(72) Inventors: Nirmal Ramesh Rayulu Vanapalli Venkata, Visakhapatnam (IN); Madhusudan Singh, Bangalore (IN); Tamilarasan Ellappan, Tiruvannamalai District (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 286 days.

(21) Appl. No.: 18/239,778

(22) Filed: Aug. 30, 2023

(65) Prior Publication Data

US 2024/0355136 A1 Oct. 24, 2024

(30) Foreign Application Priority Data

Apr. 20, 2023 (IN) .............................. 202341028817

(51) Int. Cl.
| | |
|---|---|
| *G06V 30/414* | (2022.01) |
| *G06F 40/169* | (2020.01) |
| *G06F 40/186* | (2020.01) |
| *G06V 10/94* | (2022.01) |
| *G06V 20/62* | (2022.01) |
| *G06V 30/19* | (2022.01) |

(52) U.S. Cl.
CPC .......... *G06V 30/414* (2022.01); *G06F 40/169* (2020.01); *G06F 40/186* (2020.01); *G06V 10/945* (2022.01); *G06V 20/62* (2022.01); *G06V 30/19013* (2022.01); *G06V 30/19147* (2022.01); *G06V 30/1916* (2022.01)

(58) Field of Classification Search
None
See application file for complete search history.

(56) References Cited

U.S. PATENT DOCUMENTS

| | | | |
|---|---|---|---|
| 2022/0121821 A1* | 4/2022 | Yaramada ............ | G06N 3/0464 |
| 2024/0242527 A1* | 7/2024 | Sathi ..................... | G06F 40/166 |
| 2024/0312232 A1* | 9/2024 | Wang ..................... | G06V 10/82 |

OTHER PUBLICATIONS

Dream Haddad; OCR Table Extraction Using Deep Learning (DL); Acodis website, Jul. 21, 2022.
Diego Leon; Extracting Information From PDF Invoices Using Deep Learning; Aug. 17, 2021; pp. 1-61; Stockholm; Sweden.

* cited by examiner

*Primary Examiner* — Andrew H Lam
(74) *Attorney, Agent, or Firm* — Kendal M. Sheets

(57) ABSTRACT

A method and system for relevant data extraction from a document is disclosed. The method includes determining first positional information corresponding to a key from a plurality of predefined keys in the document image based on a deep learning model. Further, second positional information corresponding to the key is determined based on OCR of the document image and an NLP model. Final positional information is determined based on the first positional information and the second positional information, in case a difference between the first positional information and the second positional information is minimal. Relevant data is extracted for the key in the OCR document image based on the final positional information.

16 Claims, 4 Drawing Sheets

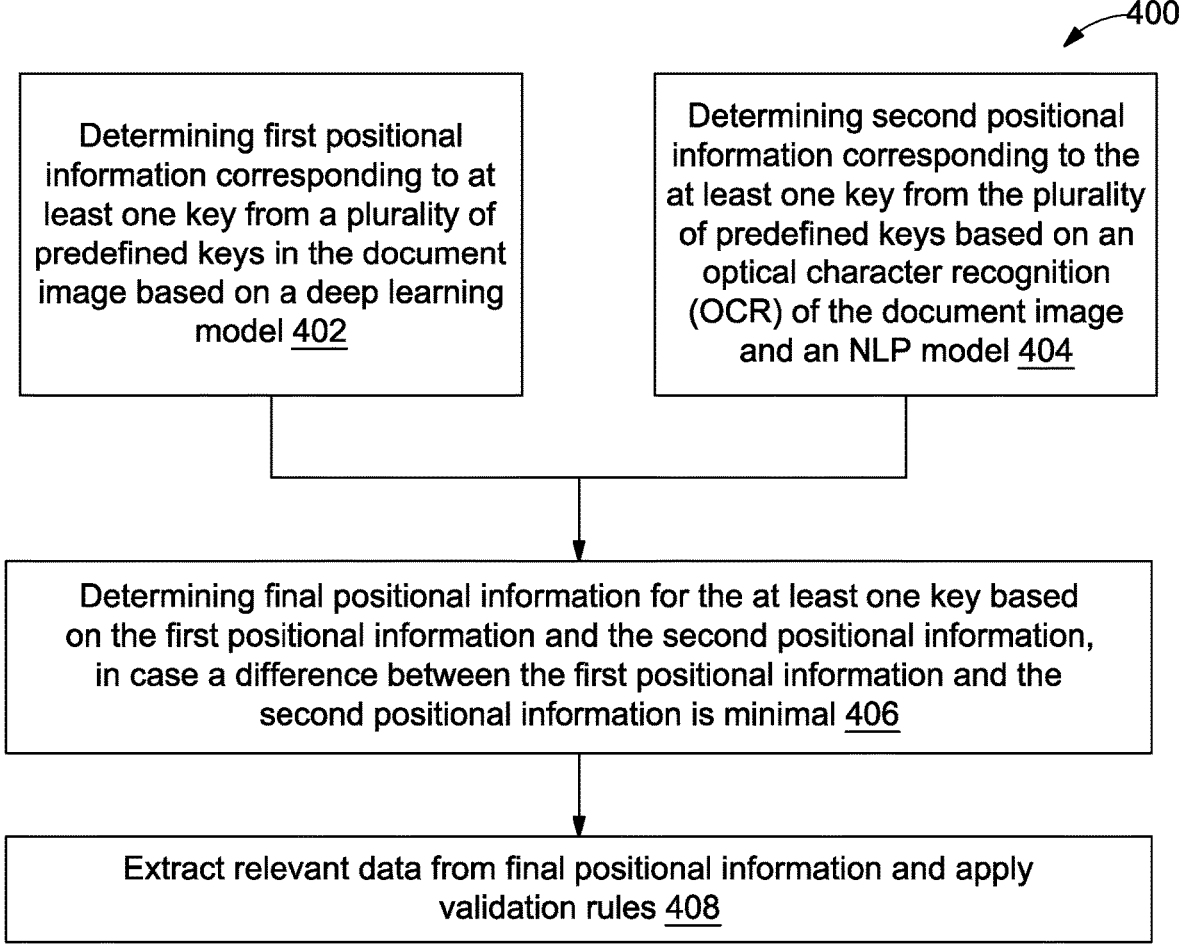

Determining first positional information corresponding to at least one key from a plurality of predefined keys in the document image based on a deep learning model 402

Determining second positional information corresponding to the at least one key from the plurality of predefined keys based on an optical character recognition (OCR) of the document image and an NLP model 404

Determining final positional information for the at least one key based on the first positional information and the second positional information, in case a difference between the first positional information and the second positional information is minimal 406

Extract relevant data from final positional information and apply validation rules 408

FIG. 4

METHOD AND SYSTEM FOR RELEVANT DATA EXTRACTION FROM A DOCUMENT

TECHNICAL FIELD

This disclosure relates generally to image processing and data extraction, and more particularly to a method and a system for extracting text information from the contents of an input file, using one or more data extraction approaches.

BACKGROUND

Text extraction techniques have assumed importance lately. For example, extraction techniques, such as Optical Character Recognition (OCR) may allow a user to extract text data from documents, such as an image or a Portable Document Format (PDF) file. Further, documents may include data in various formats which may include data having no predefined format, thus making it difficult to verify if correct data has been extracted from the documents. Further, it is complex to extract relevant information from data having no predefined format.

Some available techniques may allow determining semantic information from input files using the extracted information when the input files include tags or a predefined pattern that may be identified in the identified text. However, in complex documents, in which no tags may be present, or no pattern can be identified, it is difficult to extract relevant information and validate its correctness.

Therefore, there is a requirement for a methodology to extract relevant information from documents ensuring the correctness of data.

SUMMARY OF THE INVENTION

In an embodiment, a method of extracting relevant data from a document image is disclosed. The method may include, determining by a processor, first positional information corresponds to at least one key from a plurality of predefined keys in the document image based on a deep learning model. In an embodiment, the first positional information may be determined based on user-inputted predefined mapping information for a plurality of templates. In an embodiment, the first positional information may be determined based on the user-inputted predefined mapping information corresponding to each of the plurality of predefined keys. The method may also include, determining by the processor, second positional information corresponding to the at least one key from the plurality of predefined keys based on an optical character recognition (OCR) of the document image and an NLP model. In an embodiment, the NLP model may be trained based on the plurality of templates corresponding to the plurality of predefined keys. In an embodiment, the second positional information may be further processed based on a plurality of pre-defined rules may include predefined mapping information for each of the plurality of predefined keys in each of the plurality of templates. The method may further include, determining by the processor, the final positional information for the at least one key based on the first positional information and the second positional information in case a difference between the first positional information and the second positional information may be determined as minimal. The method may further include, extracting by the processing device the relevant data for the at least one key in the OCR document image and based on the final positional information.

In another embodiment, a system of extracting relevant data from a document image is disclosed. The system may include a processor, a memory communicatively coupled to the processor, causing the processor to determine a first positional information corresponding to at least one key from a plurality of predefined keys in the document image based on a deep learning model. In an embodiment, the first positional information may be determined based on user-inputted predefined mapping information for a plurality of templates. In an embodiment, the first positional information may be determined based on the user-inputted predefined mapping information corresponding to each of the plurality of predefined keys. Further, the processor may determine the second positional information corresponding to the at least one key from the plurality of predefined keys based on an optical character recognition (OCR) of the document image and an NLP model. In an embodiment, the NLP model may be trained based on the plurality of templates corresponding to the plurality of predefined keys. In an embodiment, the second positional information may be further processed based on a plurality of pre-defined rules comprising to a predefined mapping information for each of the plurality of predefined keys in each of the plurality of templates. Further, the processor may determine the final positional information for the at least one key based on the first positional information and the second positional information in case a difference between the first positional information and the second positional information may be determined as minimal. The system may further include, extracting by the processing device the relevant data for the at least one key in the OCR document image based on the final positional information.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a flowchart of a method of extracting relevant data from a document, in accordance with some embodiments of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope and spirit being indicated by the following claims.

Since many complex documents include data that has no predefined semantic or data type or attributes, extraction of correct data from such documents becomes a complex task. The present disclosure provides a methodology for extracting relevant data from document images ensuring the correctness of data and its attributes.

Figure 1:
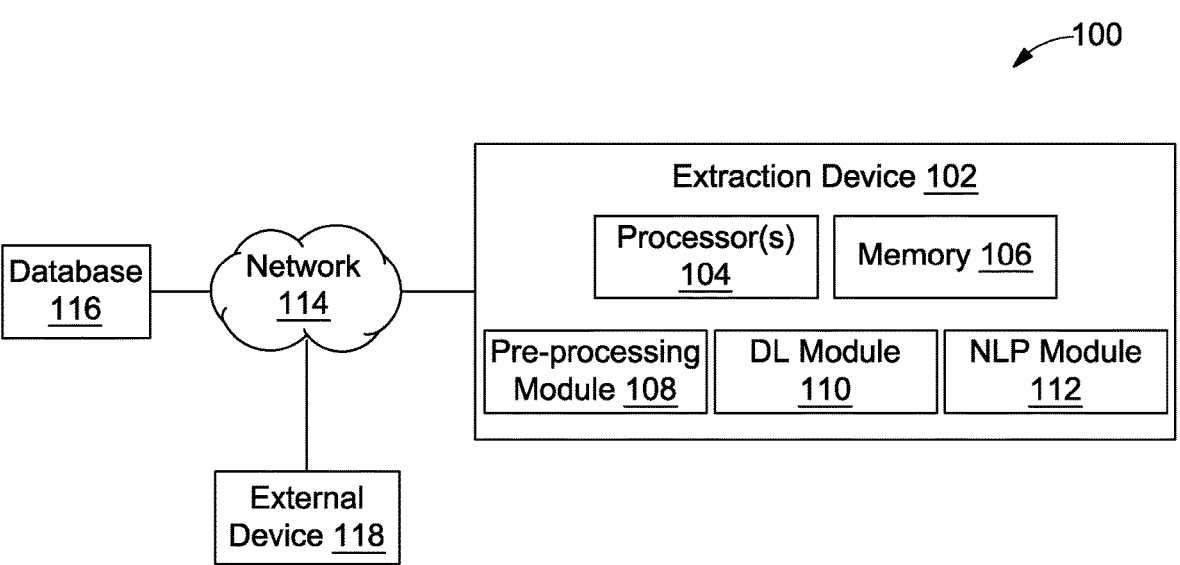
FIG. 1 illustrates a block diagram of an exemplary system for extracting relevant data from a document, in accordance with some embodiments of the present disclosure.

Referring now to FIG. 1, a block diagram of an exemplary system for extracting relevant data from a document image is illustrated, in accordance with some embodiments of the present disclosure.

The data extraction system 100 may include an extraction device 102, an external device 118, and a database 116 communicably coupled to each other through a wired or a wireless communication network 114. The extraction device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 106 may store instructions that, when executed by the processor 104, cause the processor 104 to extract relevant data from input document image, as discussed in greater detail below. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The extraction device 102 may include a pre-processing module 108, a DL module 110, and an NLP module 112 enabled by the processor 104. In an embodiment, the database 116 may be enabled in a cloud or a physical database comprising one or more document images comprising text data. In an embodiment, the database 116 may store data inputted by an external device 118 or generated by the extraction device 102.

In an embodiment, the communication network 114 may be a wired or a wireless network or a combination thereof. The communication network 114 can be implemented as one of the different types of networks, such as but not limited to, ethernet IP network, intranet, local area network (LAN), wide area network (WAN), the internet, Wi-Fi, LTE network, CDMA network, and the like. Further, the communication network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network 114 can include a variety of network devices, including routers, bridges, servers, computing devices, storage devices, and the like.

In an embodiment, the extraction device 102 may receive a request for data extraction from the external device 118 through the communication network 114. In an embodiment, the external device 118 may be a variety of computing systems, including but not limited to, a smart phone, a laptop computer, a desktop computer, a notebook, a workstation, a portable computer, a personal digital assistant, a handheld, a scanner, or a mobile device. In an embodiment, the extraction device 102 may be, but not limited to, in-built into the external device 118.

By way of an example, the extraction device 102 comprises the pre-processing module 108 may determine a format of the input file from which the relevant data is to be extracted. In case the format of the input file is determined to be that of a Portable Document Format (PDF) file, the data pre-processing module 108 may generate an image file to be inputted to the Deep Learning (DL) Module 110. Further, in case the format of the input file is not determined to be that of a scanned Portable Document Format (PDF) file, the input file may be converted to a readable PDF using one or more PDF reader tools and feed the generated readable PDF file as input to the Natural Language Processing (NLP) module 112. In case, the pre-processing module 108 determines that the format of the input files is a PDF file, it may generate an image file and perform an Optical Character Recognition (OCR) and input it to the NLP module 112. extraction device 102.

The extraction device 102 may further include a Deep Learning (DL) module 110. The DL module 110 may determine first positional information corresponding to at least one key in the document image received from the pre-processing module 108. In an embodiment, the at least one key may be determined based on a plurality of predefined keys. In an embodiment, the plurality of predefined keys may include commonly occurring words in the plurality of templates for the plurality of vendors. In an embodiment, each of the plurality of predefined keys may be associated to an attribute. For example, keys such as, "Name", "Candidate Name" or "Person Name" may be associated to an attribute "Name". The DL module 110 may be trained based on training data comprising user-inputted predefined mapping information for a plurality of templates. In an embodiment, the plurality of templates may correspond to various documents comprising one or more keys from the plurality of predefined keys and corresponding to various vendors or entities. In an exemplary embodiment, the user-inputted predefined mapping information may be inputted for each of the plurality of templates. In an embodiment, the user-inputted predefined mapping information for each of the plurality of templates may be determined based on user-defined annotation of each of the template documents for the plurality of predefined keys present in the template documents. In an embodiment, a user may provide directional information by annotating a template document for each of the vendors to define a direction in which relevant data is present corresponding to each of the plurality of predefined keys. In an embodiment, the directional information may provide a bounding box position information in one or more template documents for one or more keys and for one or more vendors. In an embodiment, the plurality of templates may be an image file belonging to one or more vendors. In an exemplary embodiment, relevant data for attribute "Name", may be extracted when keys such as, but not limited to, "Name", "Candidate Name" or "Person Name" may be detected in any input document based on directional information provided for each template corresponding to a vendor for each attribute. For example, for a template belonging to a first vendor may include "Candidate Name" as the key for attribute "Name" and the relevant data corresponding to that may be determined based on the direction information provided by annotating the template document. Similarly, for each attribute and key correspondence directional information providing a direction or coordinate information about the presence of relevant data may be defined for each vendor.

In an embodiment, the DL module 110 may be trained based on the training data comprising the user-inputted predefined mapping information to determine the first positional information corresponding to at least one key from a plurality of predefined keys in the input document image.

The extraction device 102 may further include a Natural Language Processing (NLP) module 112 to determine second positional information corresponding to the at least one key from the plurality of predefined keys based on an optical character recognition (OCR) of the document image. The NLP module 112 may be trained based on a second training data comprising the plurality of template documents corresponding to the plurality of vendors and having one or more of the plurality of predefined keys. The second positional information may further be processed based on a plurality of pre-defined rules comprising predefined mapping information for each of the plurality of predefined keys in each of the plurality of templates. In an embodiment, the plurality of pre-defined rules may correspond to the one or more rules as defined in the Indian Patent Application number IN201941054421 incorporated herein in its entirety. In an embodiment, the extraction device 102 may determine one or more keys in the OCR document image corresponding to which relevant data may be extracted by the NLP module 112 using one or more of domain-based approach, location-based approach, POS-based approach, Regex-based approach, ML-based approach, and/or an Artificial Intelligence (AI) model approach.

The extraction device 102 may determine final positional information for the at least one key based on the first positional information and the second positional information in case the difference between the first positional information and the second positional information is minimal. In an embodiment, the first positional information outputted by the DL module 110 may include at least one first bounding box determined for each of the plurality of templates for the at least one key. In an embodiment, the first bounding box information may include coordinate information of the at least one first bounding box corresponding to the at least one key in the document image for each vendor. The second positional information outputted by the NLP module 112 may include one or more second bounding boxes which may be determined based on the training data corresponding to the plurality of predefined keys and a plurality of pre-defined rules. The final positional information is selected for each key may be determined based on the determination of a minimal distance between the first bounding boxes and the second bounding boxes for each of the keys and each of the templates for the vendor. Further, the final positional information may be determined to be a coinciding area in the document image corresponding to each of the keys detected in the document image. In an embodiment, the extraction device 102 may extract the relevant data based on the final positional information. In an embodiment, the data extracted may be validated based on pre-defined validation rules based on predefined format information for each of the attributes of the keys determined in the document image.

Figure 2:
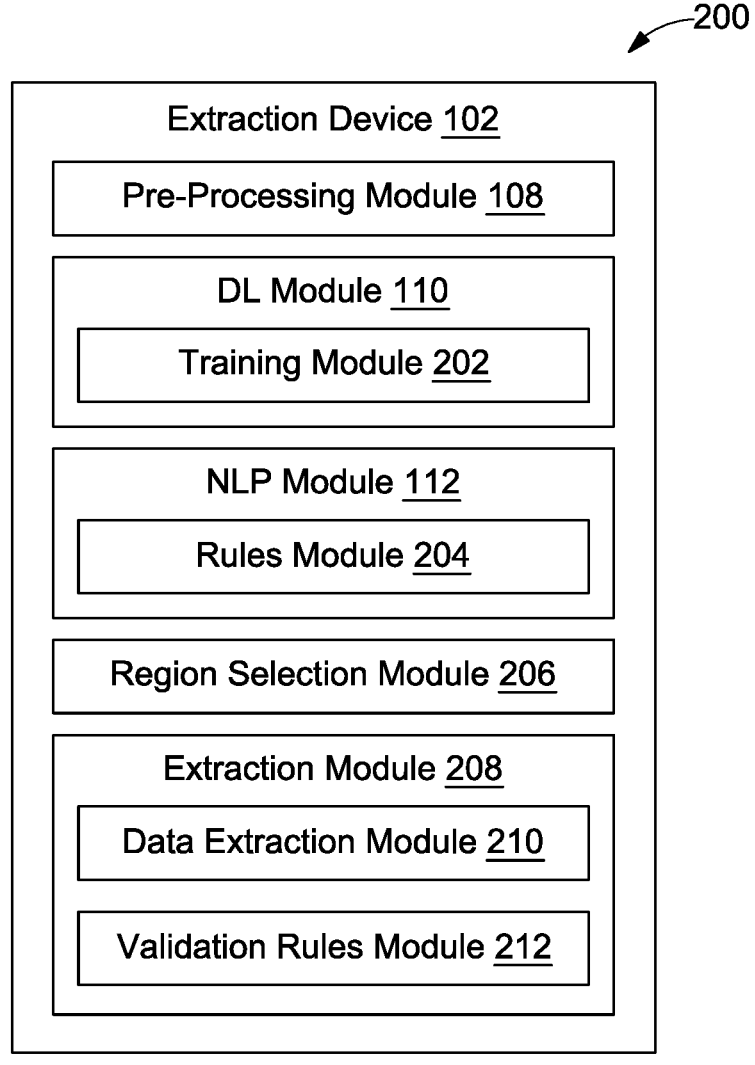
FIG. 2 is a functional block diagram of the data extraction device, in accordance with some embodiments of the present disclosure.

Referring now to FIG. 2, a functional block diagram of the extraction device 102 is illustrated, in accordance with some embodiments of the present disclosure. In an embodiment, the extraction device 102 may include a data pre-processing module 202, the DL module 110, the NLP module 112, a region selection module 206, and a validation module 212.

The data pre-processing module 108 may determine the format of the input file. In case the format of the input file is determined to be that of a Portable Document Format (PDF) file, the data pre-processing module 108 may generate an image file to be inputted to the DL Module 110. Further, in case the format of the input file is not determined to be that of a scanned PDF file, the input file may be converted to a readable PDF using one or more PDF reader tools. The readable PDF may be inputted to the NLP module 112. In case, the data pre-processing device 108 determines that the format of the input files as a PDF file, it may generate an image file and perform an OCR and input the OCR file to NLP module 112

Further, the DL module 110 may determine the first positional information corresponding to at least one key from a plurality of predefined keys in the document image. The first positional information may correspond to the at least one key and includes one or more first bounding boxes determined for each of the plurality of templates each for one or more vendors or entities. The DL module 110 may be trained with the help of training module 202. Examples of deep learning models utilized by the DL module 110 may include but are not limited to CNN, AlexNet, VGG-16, VGG-19, Caffe models, etc. The training module 202 may train the DL model 110 based on training data which may include user-inputted predefined mapping information for a plurality of templates for each of the plurality of predefined keys. The user-inputted predefined mapping information for each of the plurality of templates may be determined based on user-defined annotation in each of the plurality of templates for each of the plurality of predefined keys. In an embodiment, based on the user-defined annotation a location of presence relevant test may be provided in each of the template images for each of the keys. In an embodiment, the user-inputted predefined mapping information may also correspond to a plurality of attributes. Based on the annotation, a direction information corresponding to each of the plurality of predefined keys may be determined. In an embodiment, the directional information may include a direction in which relevant data may be present corresponding to each of the plurality of predefined keys in each of the plurality of templates.

The NLP module 112 may further determine second positional information corresponding to the at least one key from the plurality of predefined keys based on an optical character recognition (OCR) of the document image and an NLP model. The second positional information corresponding to the at least one key, may include one or more second bounding boxes determined based on the user-defined annotations in each of the plurality of templates. The NLP module 112 may be trained with the help of rules module 204 based on the plurality of templates corresponding to the plurality of predefined keys. The second positional information may further be processed based on a plurality of pre-defined rules comprising predefined mapping information for each of the plurality of predefined keys in each of the plurality of templates. The predefined mapping information for each of the plurality of templates may be determined based on directional information provided for each key. The predefined mapping information comprises a plurality of attributes and direction information corresponding to each of the plurality of predefined keys. The directional information comprises a direction in which relevant data may present corresponding to each of the plurality of predefined keys in each of the plurality of templates. Table 1 below shows an exemplary list of rules for keys which may be keywords detected in the input document and corresponding attributes and directional information for the relevant data.

TABLE 1

| Attribute List | Keys | Template 1 | Template 2 | Template 3 |
|---|---|---|---|---|
| Name | 1. Name 2. Candidate Name 3. Person Name | R | R | S |
| Age | 1. Age 2. Candidate AGE 3. Person Age | R | S | S |

As shown in Table 1, for keys which may be detected in the readable input file such as, but not limited to, "Name", "Candidate Name", "Person Name", etc. may be associated to attribute "Name", and directional information for relevant data is provided for each of the plurality of templates. For example, for Template 1, the relevant data for attribute "Name" can be found in the cell present of right side of the cell including the key corresponding to attribute "Name". Similarly, for Template 3, the relevant data for attribute "Name" can be found in the same cell in which the key corresponding to attribute "Name" is detected. Accordingly, directional information for each of the plurality of pre-defined keys and attributes for each of the Templates is pre-defined as predefined rules. In an embodiment, the direction information may include the direction in terms of same cell, down cell, right cell or left cell corresponding to the cell in which a key is detected. In an embodiment, the directional information may include directional information in terms of direction and distance of coordinates related to the coordinates of the key. In an embodiment, the plurality of pre-defined rules may correspond to the one or more rules as defined in the Indian Patent Application number IN201941054421 incorporated herein in its entirety. In an embodiment, the extraction device 102 may determine one or more keys in the OCR document image corresponding to which relevant data may be extracted by the NLP module 112 using one or more of domain-based approach, location-based approach, POS-based approach, Regex-based approach, ML-based approach, and/or an Artificial Intelligence (AI) model approach.

The extraction device 102 may further include a region selection module 206. The region selection module 206 may determine final positional information for the at least one key based on the first positional information and the second positional information in case a difference between the first positional information and the second positional information is minimal. The final positional information for the at least one key may be determined by comparing the distance between each first of the one or more first bounding boxes and the one or more second bounding boxes for each of the plurality of keys detected in the input document. Accordingly, the final bounding box is selected as one of the first bounding box and the second bounding box for a key that has the minimum difference in distance between them. In an embodiment, the final binding box may be determined to be the first bounding box and the second bounding box which may correspond to a coinciding region in the document image for a key from the plurality of predefined keys.

The extraction device 102 may further include an extraction module 208. The extraction module 208 may further include a data extraction module 210. The data extraction module 210 may extract the final data comprising the relevant text data and the corresponding attribute, from the OCR document image corresponding to the at least one key. In an embodiment, the extracted final data is extracted based on validation of the relevant data based on pre-defined validation rules stored in the validation rules module 212.

In an exemplary embodiment, the plurality of predefined validation rules may include a list of rules defining if in case a key detected is "Date" then the extracted text result may be numeric text and in a date format by virtue of its content and format. Likewise, any relevant text for the key "purchase order number" may be numeric or alphanumeric. Likewise, a relevant text for the key "phone number" may be validated if it is numeric by virtue of its content and format.

Figure 3:
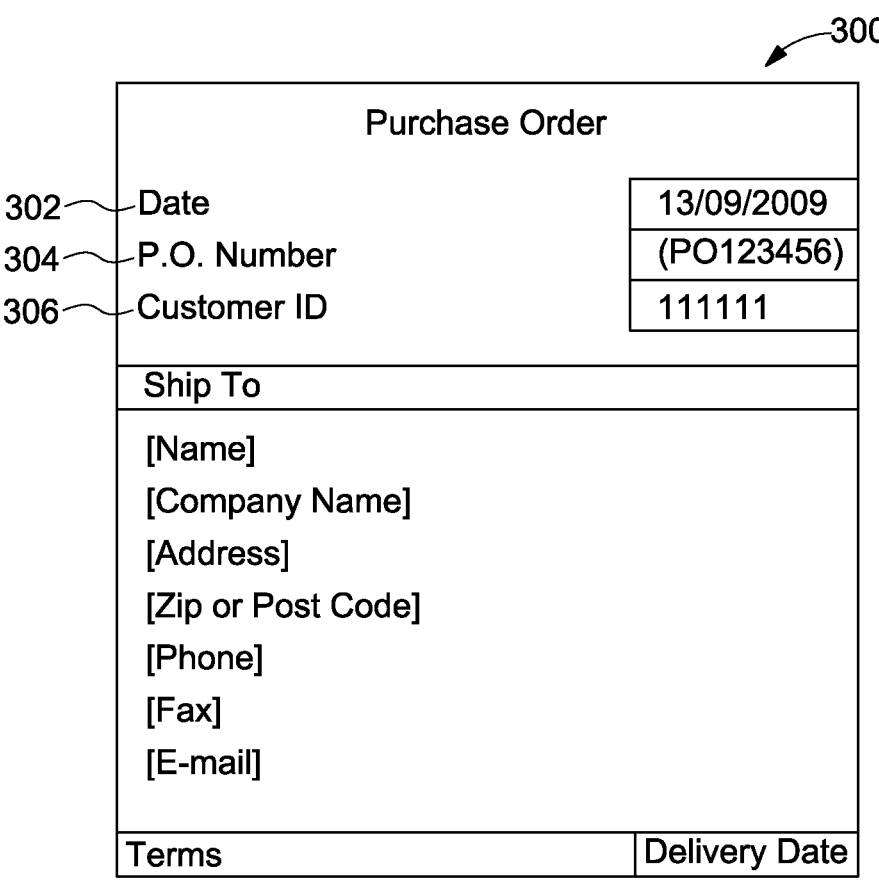
FIG. 3 depicts a snapshot of an exemplary input file, in accordance with an embodiment of the present disclosure.

Referring now to FIG. 3, a snapshot of an exemplary input file 300 is illustrated, in accordance with an embodiment of the present disclosure. In an exemplary embodiment, the exemplary input file 300 comprises a plurality of keys 302, 304 and 306 and their corresponding relevant values. In an embodiment, the DL module 110 may determine the first positional information corresponding to the key 304 i.e. "P.O. Number". The first positional information corresponding to the key 304, may be determined as one or more first bounding boxes determined for each of the plurality of templates. In an exemplary embodiment, the first positional information may include a coordinate value corresponding to the first bounding box for key 304 i.e. "P.O. Number" determined based on the DL module which may be [271, 45, 332, 55]. Further, the NLP module 112 may determine the second positional information corresponding to the key 304, based on the OCR of the document image 300. The second positional information corresponding to the key 304, may include one or more second bounding boxes determined based on the predefined rules. In an exemplary embodiment, the second bounding box coordinate value corresponding to the key 304 based on the NLP module 112 may be determined as [273, 46, 330, 54]. The first difference between the first bounding box and the first second bounding box as determined by the region selection module 206 is: [2, 1, 2, 1]. Further, one more second bounding box value for the key 304 may be determined by the NLP module 112 as: [296, 85, 367, 105]. The second difference between the first bounding box and the second bounding box is determined to be: [25, 40, 35, 50]. Since the first difference is lesser than the second difference the region corresponding to the first bounding box i.e. [271, 45, 332, 55] or the second bounding box i.e. [273, 46, 330, 54] may be selected as the final positional information based on which the relevant data may be extracted.

Referring to FIG. 3, after applying validation rules on the exemplary input image file 300 for the key 304, the output determined for the key:

Result: Key and Value

Example: P.O Number, PO123456

Referring now to FIG. 4, a flowchart of a method of extracting relevant data from a document, in accordance with some embodiments of the present disclosure. In an embodiment, method 400 may include a plurality of steps that may be performed by the processor 104 to extract relevant text data in a document.

At step 402, the processor 104 may determine first positional information corresponding to at least one key from a plurality of predefined keys in the document image based on a deep learning model. In an embodiment, the deep learning model may be trained based on user-inputted predefined mapping information for a plurality of templates. Further, in an embodiment, the first positional information may be determined based on the user-inputted predefined mapping information corresponding to each of the plurality of predefined keys.

Further at step 404, the processor 104 may determine the second positional information corresponding to the at least one key from the plurality of predefined keys based on an optical character recognition (OCR) of the document image and an NLP module. In an embodiment, the second positional information corresponding to the at least one key may include one or more second bounding boxes determined for each of the plurality of templates. In an embodiment, the NLP model may be trained based on the plurality of templates corresponding to the plurality of predefined keys. Further, the second positional information may be further processed based on a plurality of pre-defined rules which may include predefined mapping information for each of the plurality of predefined keys in each of the plurality of templates.

At step 406, the processor 104 may determine the final positional information for the at least one key based on the first positional information and the second positional information, in case a difference between the first positional information and the second positional information is minimal.

At step 408, the processor 104 may extract the relevant data for the at least one key in the OCR document image based on the final positional information. In an embodiment, the relevant data along with the key or the attribute may be extracted.

It is intended that the disclosure and examples be considered as exemplary only, with a true scope of disclosed embodiments being indicated by the following claims.

What is claimed is:

1. A method of extracting relevant data from a document image, the method comprising:
    determining, by a processor, first positional information comprising at least one first bounding box, corresponding to at least one key from a plurality of predefined keys in the document image based on a deep learning model,
        wherein the deep learning model is trained based on user-inputted predefined mapping information for a plurality of templates, and
        wherein the first positional information is determined based on the user-inputted predefined mapping information corresponding to each of the plurality of predefined keys;
    determining, by the processor, second positional information comprising one or more second bounding boxes, corresponding to the at least one key from the plurality of predefined keys based on an optical character recognition (OCR) of the document image and an NLP model,
        wherein the NLP model is trained based on the plurality of templates corresponding to the plurality of predefined keys, and
        wherein the second positional information is further processed based on a plurality of pre-defined rules comprising a predefined mapping information for each of the plurality of predefined keys in each of the plurality of templates;
    determining, by the processor, final positional information for the at least one key based on comparison of the first positional information and the second positional information, in case a difference between the first positional information and the second positional information is minimal; and extracting, by the processor, relevant data for the at least one key in the OCR document image based on the final positional information.

2. The method of claim 1, wherein the predefined mapping information comprises a plurality of attributes and a direction information corresponding to each of the plurality of predefined keys,
    wherein the directional information comprises a direction in which a relevant data is present corresponding to each of the plurality of predefined keys in each of the plurality of templates, and
    wherein the second positional information is determined based on determination of at least one of the plurality of attributes based on the OCR of the document image.

3. The method of claim 2, wherein the first positional information corresponding to the at least one key, comprises the at least one first bounding box determined for each of the plurality of templates.

4. The method of claim 3, wherein the user inputted predefined mapping information for each of the plurality of templates is determined based on user defined annotation in each of the of the plurality of templates for each of the plurality of predefined keys,
    wherein the second positional information corresponding to the at least one key, comprises the one or more second bounding boxes determined for each of the plurality of templates, and
    wherein the one or more second bounding boxes are determined based on the plurality of pre-defined rules.

5. The method of claim 4, wherein the final positional information for the at least one key is determined based on a comparison of the at least one first bounding box with each of the one or more second bounding boxes determined for each of the plurality of templates.

6. The method of claim 5, comprises: extracting, by the processor, a final data comprising the relevant text and the at least one attribute, from the OCR document image corresponding to the at least one key based on a validation of the relevant data, wherein the relevant data is validated based on pre-defined validation rules.

7. A system for extracting relevant data from a document image, the system comprising:
    a processor; and
    a memory communicatively coupled to the processor, wherein the memory stores processor-executable instructions, which, on execution by the processor, cause the processor to:
        determine first positional information comprising at least one first bounding box, corresponding to at least one key from a plurality of predefined keys in the document image based on a deep learning model,
            wherein the deep learning model is trained based on user-inputted predefined mapping information for a plurality of templates, and
            wherein the first positional information is determined based on the user-inputted predefined mapping information corresponding to each of the plurality of predefined keys;
        determine second positional information comprising one or more second bounding boxes, corresponding to the at least one key from the plurality of predefined keys based on an optical character recognition (OCR) of the document image and an NLP model,
            wherein the NLP model is trained based on the plurality of templates corresponding to the plurality of predefined keys, and

wherein the second positional information is further processed based on a plurality of pre-defined rules comprising a predefined mapping information for each of the plurality of predefined keys in each of the plurality of templates;

determine final positional information for the at least one key based on comparison of the first positional information and the second positional information, in case a difference between the first positional information and the second positional information is minimal; and extract relevant data for the at least one key in the OCR document image based on the final positional information.

8. The system of claim 7, wherein the predefined mapping information comprises a plurality of attributes and a direction information corresponding to each of the plurality of predefined keys, wherein the directional information comprises a direction in which a relevant data is present corresponding to each of the plurality of predefined keys in each of the plurality of templates, and wherein the second positional information is determined based on determination of at least one of the plurality of attributes based on the OCR of the document image.

9. The system of claim 8, wherein the first positional information corresponding to the at least one key, comprises the at least one first bounding box determined for each of the plurality of templates, wherein the second positional information corresponding to the at least one key, comprises the one or more second bounding boxes determined for each of the plurality of templates, wherein the one or more second bounding boxes are determined based on the plurality of pre-defined rules, and wherein the final positional information for the at least one key is determined based on a comparison the at least one first bounding box with each of the one or more second bounding boxes determined for each of the plurality of templates.

10. The system of claim 9, wherein the processor is configured to extract a final data comprising the relevant text and the at least one attribute, from the OCR document image corresponding to the at least one key based on a validation of the relevant data, wherein the relevant data is validated based on pre-defined validation rules.

11. A non-transitory computer-readable medium storing computer-executable instructions for extracting relevant data from a document image, the computer-executable instructions configured for:

determining first positional information comprising at least one first bounding box, corresponding to at least one key from a plurality of predefined keys in the document image based on a deep learning model, wherein the deep learning model is trained based on user-inputted predefined mapping information for a plurality of templates, and wherein the first positional information is determined based on the user-inputted predefined mapping information corresponding to each of the plurality of predefined keys;

determining second positional information comprising one or more second bounding boxes, corresponding to the at least one key from the plurality of predefined keys based on an optical character recognition (OCR) of the document image and an NLP model, wherein the NLP model is trained based on the plurality of templates corresponding to the plurality of predefined keys, and wherein the second positional information is further processed based on a plurality of pre-defined rules comprising a predefined mapping information for each of the plurality of predefined keys in each of the plurality of templates;

determining final positional information for the at least one key based on comparison of the first positional information and the second positional information, in case a difference between the first positional information and the second positional information is minimal; and extracting relevant data for the at least one key in the OCR document image based on the final positional information.

12. The non-transitory computer-readable medium of claim 11, wherein the predefined mapping information comprises a plurality of attributes and a direction information corresponding to each of the plurality of predefined keys, wherein the directional information comprises a direction in which a relevant data is present corresponding to each of the plurality of predefined keys in each of the plurality of templates, and wherein the second positional information is determined based on determination of at least one of the plurality of attributes based on the OCR of the document image.

13. The non-transitory computer-readable medium of claim 12, wherein the first positional information corresponding to the at least one key, comprises the at least one first bounding box determined for each of the plurality of templates.

14. The non-transitory computer readable medium of claim 13, wherein the user inputted predefined mapping information for each of the plurality of templates is determined based on user defined annotation in each of the of the plurality of templates for each of the plurality of predefined keys, wherein the second positional information corresponding to the at least one key, comprises the one or more second bounding boxes determined for each of the plurality of templates, and wherein the one or more second bounding boxes are determined based on the plurality of pre-defined rules.

15. The non-transitory computer readable medium of claim 14, wherein the final positional information for the at least one key is determined based on a comparison of the at least one first bounding box with each of the one or more second bounding boxes determined for each of the plurality of templates.

16. The non-transitory computer readable medium of claim 15, comprises: extracting, by the processor, a final data comprising the relevant text and the at least one attribute, from the OCR document image corresponding to the at least one key based on a validation of the relevant data, wherein the relevant data is validated based on pre-defined validation rules.

* * * * *